United States Patent
Popick

(10) Patent No.: US 12,375,290 B2
(45) Date of Patent: *Jul. 29, 2025

(54) SECURE TRANSPORT OF CONTENT VIA CONTENT DELIVERY SERVICE

(71) Applicant: Amazon Technologies, Inc., Seattle, WA (US)

(72) Inventor: Daniel Stephen Popick, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 58 days.

This patent is subject to a terminal disclaimer.

(21) Appl. No.: 17/687,502

(22) Filed: Mar. 4, 2022

(65) Prior Publication Data

US 2022/0191042 A1    Jun. 16, 2022

Related U.S. Application Data

(63) Continuation of application No. 15/282,618, filed on Sep. 30, 2016, now Pat. No. 11,271,750.

(51) Int. Cl.
*H04L 29/06*    (2006.01)
*H04L 9/32*    (2006.01)
*H04L 9/40*    (2022.01)

(52) U.S. Cl.
CPC .......... *H04L 9/3247* (2013.01); *H04L 9/3236* (2013.01); *H04L 9/3242* (2013.01);
(Continued)

(58) Field of Classification Search
CPC ... H04L 9/3247; H04L 9/3236; H04L 9/3242; H04L 9/3263; H04L 63/0428; H04L 63/0435; H04L 63/0442; H04L 2209/60; H04L 2209/72; H04L 9/3239; H04L 63/0823; H04L 63/126; H04L 63/0245;
(Continued)

(56) References Cited

U.S. PATENT DOCUMENTS 6,367,009 B1    4/2002   Davis et al.
7,661,131 B1    2/2010   Shaw et al.
(Continued)

*Primary Examiner* — Joseph P Hirl
*Assistant Examiner* — Leynna Truvan
(74) *Attorney, Agent, or Firm* — Robert C. Kowert; Kowert, Hood, Munyon, Rankin & Goetzel, P.C.

(57) ABSTRACT

Devices and techniques for secure transmission of content over third-party networks are provided. Keys are established for secure transport of content between a source and recipient via a third party. The source generates a content package that includes an encrypted payload, and a payload handler. In some instances, the content package may also include user interface code for obtaining a secret from the recipient. The content package may be signed (e.g., the message content hashed and the result of the hash added to the content package). The content package is transmitted over a connection to a content delivery service for delivery to recipient(s) via another connection. The content delivery service receives the package and forwards the package to recipient(s) without decrypting the payload. A recipient receives the package from the content delivery service, validates the package and decrypts the payload. The payload may be presented to a display application.

20 Claims, 8 Drawing Sheets

(52) U.S. Cl.
CPC ........ *H04L 9/3263* (2013.01); *H04L 63/0428* (2013.01); *H04L 63/0435* (2013.01); *H04L 63/0442* (2013.01); *H04L 2209/60* (2013.01)

(58) Field of Classification Search
CPC ... H04L 67/327; H04L 1/0005; H04L 1/0008; H04L 1/008; H04L 1/0084; H04L 1/0089; H04L 5/0044; H04L 29/06591; G06F 2212/402; G11B 20/00485; G11B 20/005
See application file for complete search history.

(56) References Cited

U.S. PATENT DOCUMENTS

| | | | |
|---|---|---|---|
| 2003/0147390 A1* | 8/2003 | Rizzo | H04L 45/24 370/432 |
| 2006/0041938 A1 | 2/2006 | Ali | |
| 2006/0233166 A1 | 10/2006 | Bou-Diab et al. | |
| 2008/0137670 A1* | 6/2008 | Ebrom | G06F 11/3495 714/E11.202 |
| 2008/0171598 A1* | 7/2008 | Deng | G07F 17/32 463/40 |
| 2009/0083783 A1* | 3/2009 | Park | H04N 21/2362 725/25 |
| 2010/0310059 A1* | 12/2010 | Davis | H04M 3/5166 379/142.04 |
| 2013/0201845 A1* | 8/2013 | Cortes Gomez | H04W 48/17 370/252 |
| 2014/0194112 A1* | 7/2014 | Ngo | H04W 4/16 455/419 |
| 2015/0034720 A1* | 2/2015 | Minogue | G06Q 10/0832 235/385 |
| 2015/0350119 A1 | 12/2015 | Thirumalai et al. | |
| 2018/0013732 A1* | 1/2018 | Rubenstein | H04L 67/60 |

* cited by examiner

SECURE TRANSPORT OF CONTENT VIA CONTENT DELIVERY SERVICE

BACKGROUND

This application is a continuation of U.S. patent application Ser. No. 15/282,618, filed Sep. 30, 2016, which is hereby incorporated by reference herein in its entirety.

Delivery channels, (e.g., third party delivery channels) may be used to deliver content to recipients. The delivery channels that provide a content delivery service may be relied on to provide secure delivery of the message on behalf of the customer. At least some security techniques implemented by the third-party delivery service on behalf of the customer may leave the content exposed to the third-party delivery service.

For instance, secure transport of content by the content delivery service may rely on cryptographic protocols (e.g., TLS, SSL, etc.) to transport content from the content source to the content delivery service network, and then again from the content delivery service network to the recipient. Some such cryptographic protocols may expose the content to the content delivery service network, such as at a point between terminations of a connection protocol.

For instance, while a cryptographic protocol may be used to transport content from the source to the third party channel, and then again from the third party channel to the recipient, the content may be exposed to the third party channel at the termination point of the cryptographic protocol used to transport the content to the third party channel. In some instances, it is desirable to deliver content via a network-based connection (e.g., HTTP) without exposing the content to the content delivery service.

Additionally, content sent from a source to a destination via a third party may be subject to various attacks. For example, a malicious party may alter the content (e.g., modify the encrypted data or inject code into a content page).

Figure 1A:
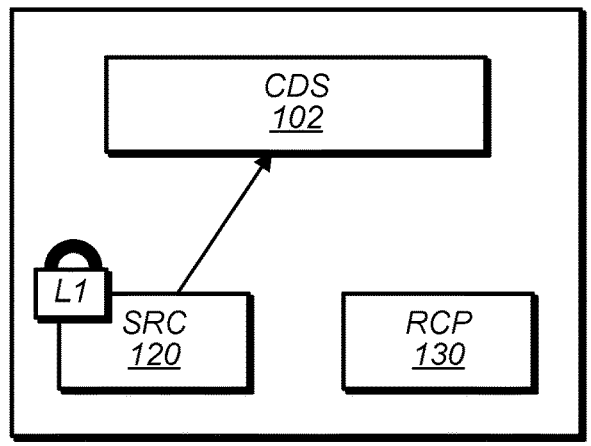
FIGS. 1A-1C depict various techniques for transmitting content from a source to a recipient via a content delivery service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and devices provide secure transport of content via a content delivery service without exposing the content to the content delivery service. Generally, an initialization process establishes a key pair at a source and a destination. A source entity generates a content package that includes an encrypted payload (e.g., web page content encrypted with one of the keys), user interface code, and a payload handler, and transmits the content over a network to a content delivery service that stores and/or forwards the content package to a recipient entity, in embodiments. The recipient entity receives the content package, and runs the user interface (UI) code at the recipient entity to obtain a secret. The secret is used to determine authorization and a decryption key associated with the content package is identified and used to decrypt the encrypted payload. The payload handler initiates processing, (e.g., unloading, decryption, providing the content to the display application, or any other processing performed on the payload, etc.) of the encrypted payload at the recipient entity, in embodiments. The payload handler may invoke the payload for processing (e.g., present itself as part of the user interface or display application). The payload handler passes the content to a display application (e.g., incorporates content into a webpage displayed by a browser) in embodiments.

Establishment of the keys at the source and recipient may be performed a number of different ways. Keys may be established by any form of communication that is outside the content delivery service (e.g., telephone, e-mail, other data channel, etc.). For instance, an administrator may establish the keys via respective key managers of the entities as part of an initialization or set up process.

In embodiments, the source may sign the content package prior to transmitting it to the content delivery service. For example, generating a hash from a package that includes the encrypted payload, UI code, and the payload handler, and including the hash (and the hashing algorithm, in embodiments) along with the content package.

In an example embodiment taking place in the context of a cloud-based computing service provider (e.g., a third-party provider), the encrypted payload may include a portion of content related to a client's instance(s) running in the cloud. The content may need to be displayed on a management console, for example on a web page, presented to the client such that the client can manage the running instance(s). The content may need to be securely transmitted to the management console over the network of the third-party provider. The content package described herein may be used to securely transport the content via a third-party provider (e.g., a content delivery service) without exposing the secured content to the transport network of the third-party provider. In other examples, a customer's incoming application traffic may be distributed across multiple processing instances provided by a third-party provider and/or a customer's content (websites, APIs, etc.) or other assets may be delivered to end users. The content package described herein may be used to securely transport the customer's content via a third-party provider (e.g., a content delivery service) without exposing the customer's secured content to the transport network of the third-party provider.

Figure 1B:
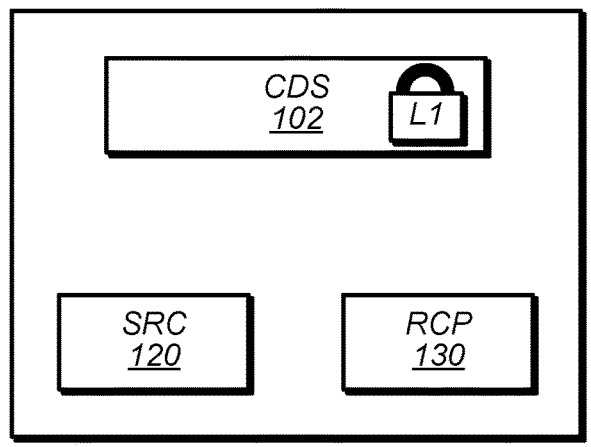
Figure 1C:
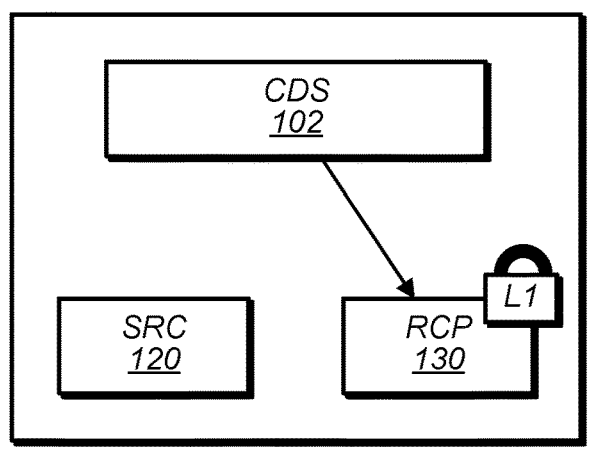

FIGS. 1A-1C depict various techniques for securely transmitting content from a source to a recipient via a content delivery service, according to at least some embodiments. The content being securely transmitted may be of any digital variety (e.g., data, message content, audio or video content, web-page content, etc.). illustrate Embodiments described herein are an improvement over transmission of content from a source to a recipient via a content delivery service using a cryptographic connection protocol (e.g., TLS, SSL., etc.) that terminates at the content delivery service. In those instances, because the cryptographic protocol terminates at the content delivery service, the protected content is decrypted and may be exposed to the content delivery service (at least until it is re-encrypted and sent out to the ultimate destination).

FIGS. 1A-1C illustrate transmission of an encrypted payload from a source to a recipient via a content delivery service in a manner where the content is not exposed to the content delivery service. The components and processes illustrated in FIGS. 2-7 implement the depicted transmission in FIGS. 1A-1C, in embodiments. In FIGS. 1A-1C the encrypted content that is received from the source 120 remains encrypted through the entire content delivery system 102 and is delivered to recipient 130 as the same encrypted content that was sent from source 120. For instance, the encrypted content that is received at the recipient is encrypted by the same key as the encrypted content that was transmitted by the source. The content delivery service does not decrypt the content package, in embodiments. The encrypted content (encrypted payload) remains encrypted as it passed through the content delivery service, in embodiments.

In FIGS. 1A-1C, content sent from the source 120 to the recipient 130 is sent via content delivery service 102. FIG. 1A illustrates that the content is first encrypted at the source 120 and then transmitted to content delivery system 102 (the lock placed on the source 120 illustrates that the content is protected at the source, prior to transmission, instead of as part of a cryptographic transmission protocol. FIG. 1B illustrates that the content remains protected within the content delivery system 102 (e.g., remains encrypted under the same key used by the source 120 in FIG. 1A). FIG. 1C illustrates that the encrypted content remains encrypted with lock L1 after transport to the recipient 130, and is encrypted in the same encrypted form as it left the source 120 in FIG. 1A. In the embodiment depicted in FIGS. 1A-1C the content is not exposed to the third-party content delivery system 102.

FIGS. 1A-1C are in contrast to systems that rely upon cryptographic communication protocols (such as TLS or SSL) to deliver content via a third-party delivery network. In systems that rely upon a cryptographic communication protocol, the protected link terminates at the third-party delivery network and the content that was delivered over the protected link is exposed to the third party network. In some such systems, the content is re-encrypted by the third party network as it is sent over a protected link to the recipient (e.g., using another encryption key). Thus, systems that rely upon a cryptographic communication protocol MAY expose the clear content to the third party delivery service in-between being sent over the first link encrypted with the first key and being sent over a second link encrypted with a second key.

Figure 2:
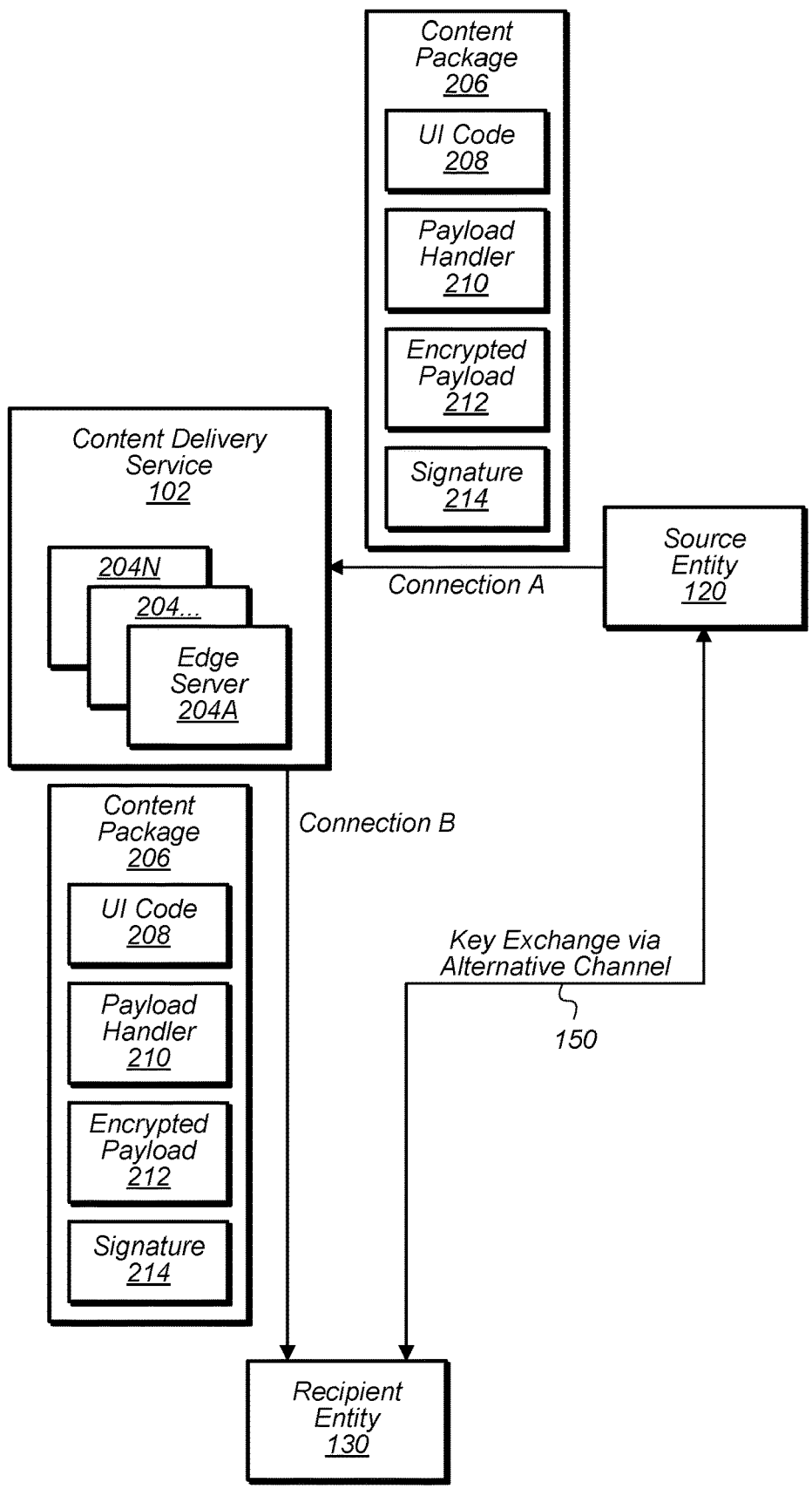
FIG. 2 depicts transmission of a content package from a source entity to a recipient entity via a content delivery service, according to at least some embodiments.

FIG. 2 depicts transmission of a content package from a source entity to a recipient entity via a content delivery service, according to at least some embodiments. FIG. 2 depicts a system environment where the processes illustrated in FIGS. 4-6 may be implemented, in some embodiments. For example, FIG. 2 illustrates establishing keys between source entity 120 and recipient entity 130 via an alternative channel exchange (e.g., see blocks 402/412 of FIGS. 4A/4B). In embodiments, the alternative channel is a channel distinct from the communication channel of the content delivery service over which the content package is sent (e.g., telephone, e-mail, other data channel, administrative process, etc.). Performing a key exchange via a channel distinct from the content delivery service 102 may reduce or prevent certain types of attacks (e.g., attacks to obtain the keys to decrypt the content) in embodiments.

In at least some embodiments described herein, either a shared symmetric key or the public component of an asymmetric key is supplied to the source of the content, but via a channel outside of the channel managed by the third-party provider.

In an example illustrative of asymmetric cryptography, the public key of a public/private key pair may be used to encrypt the content package at the source. A private key of a public/private key pair may be installed on a recipient entity system (e.g., via an initialization process by an administrator or via some channel not controlled by the third-party provider). In some instances, the private key may be installed via telephone, e-mail, other data channel, administrative process, etc. The recipient entity may validate the content package using the private key that has been installed on the recipient entity device.

Also depicted is content package 206 that includes user interface (UI) code 208, payload handler 210 (e.g., JAVA script), encrypted payload 212, and signature 214. In at least the illustrated embodiments, the content package is generated by source entity 120 (e.g., as described in FIGS. 4A and 5, below) and transmitted over connection A (e.g., an HTTP connection) to content delivery service 102 (e.g., a network-based service provider). In some embodiments, the content package 206 may be packetized and transported to the edge server (e.g., via HTTP).

In embodiments, instead of sending the content package including the UI code 208, payload handler 210, encrypted payload 212 and signature 214, the content package 206 may be transmitted in component portions (e.g., the UI code 208, and/or the payload handler 210 may be sent in separate packages from the encrypted payload 212, each with or without the security measures such as a signature, in some embodiments).

Generally, in some embodiments, UI code 208 may be program code configured to be executed by the recipient in order to obtain a secret from the recipient. The secret may be used for authorization and/or may be used to identify a key used to decrypt the encrypted payload at the recipient, in embodiments.

In some instances, the UI code 208 and payload handler 210 may work in concert with regard to the encrypted content. For example, the payload handler 210 and the UI code 208 may work in concert to decrypt the payload and incorporate the payload into the displayed content.

In another example, the UI code 208 may run on the recipient entity machine (e.g., within a browser or other display application) and provide user interface display elements that prompt for and receive a secret (e.g., a shared secret also known to the source entity). In at least on example, the payload handler 210 may instruct application of a password derivation function (e.g., Bcrypt, PBKDF2 or the like) to the password to produce a symmetric key and instruct the decryption engine 337 to decrypt the encrypted content package. In some examples, the payload handler 210 may instruct application of a password derivation function (e.g., Bcrypt, PBKDF2 or the like) to the password to produce an asymmetric key and instruct the decryption engine 337 to decrypt the encrypted content package using the asymmetric key.

In some embodiments, the payload handler 210 may include instructions that cause a portion of the display information (e.g., a webpage) to be replaced with the decrypted content.

Content delivery service 102 is illustrated with edge servers 204A . . . 204N. Other types of services or networks (e.g., content delivery networks, service providers, etc.) are also contemplated for providing delivery or transport of the content package 206 to any number of recipient entities (e.g., recipient entity 130). For instance, once source entity 120 has transmitted content package 206 to the content delivery service 102 via connection A, the content delivery service may forward or transmit the content package 206 to recipient entity 1309 via connection B. In some embodiments, the content package 206 that is transmitted via connection A is the same content package 206 that is transmitted via connection B. The content delivery service (e.g., a third party) may store and/or forward the content package 206 without decrypting or unpacking the package, in embodiments.

Figure 3:
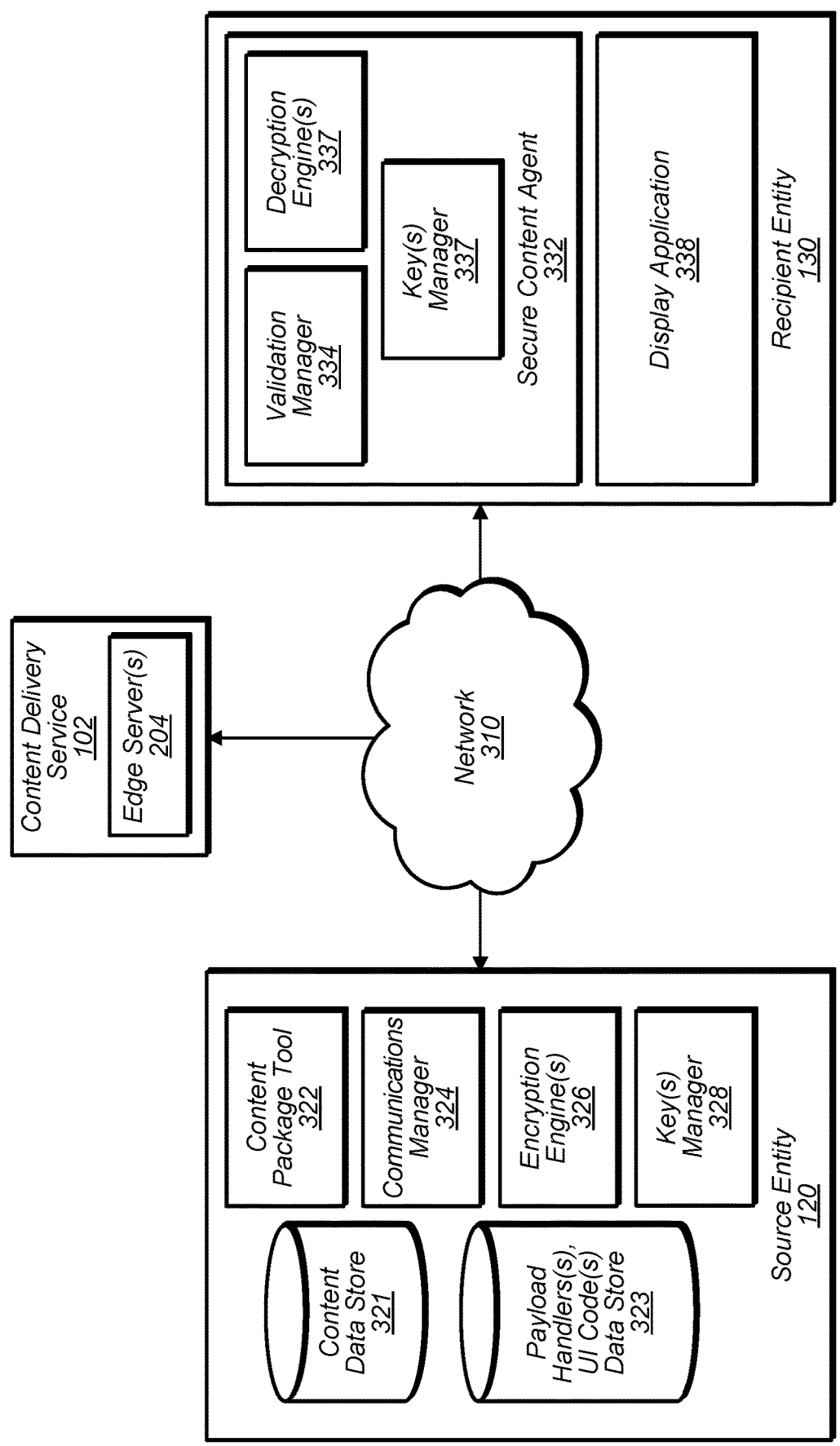
FIG. 3 depicts functional components of a source entity, a content delivery service and a recipient entity, according to at least some embodiments.

FIG. 3 depicts functional components of a source entity, a content delivery service and a recipient entity, connected via network 310 (e.g., a public network such as the Internet, a private network such as an enterprise network, a service provider network, etc., or some combination thereof), according to at least some embodiments. The depicted components may perform some or all of the functionality described in FIGS. 4-6, in embodiments. It is contemplated that some embodiments may include additional or fewer components than those depicted in FIGS. 1-3, that components may be combined or separated into smaller components and that various functionality may be performed by one or more different components than those depicted, sometimes in concert with other components, in embodiments. It is also contemplated that some embodiments may include additional functionality and that some functionality may be left out in some embodiments.

Figure 4A:
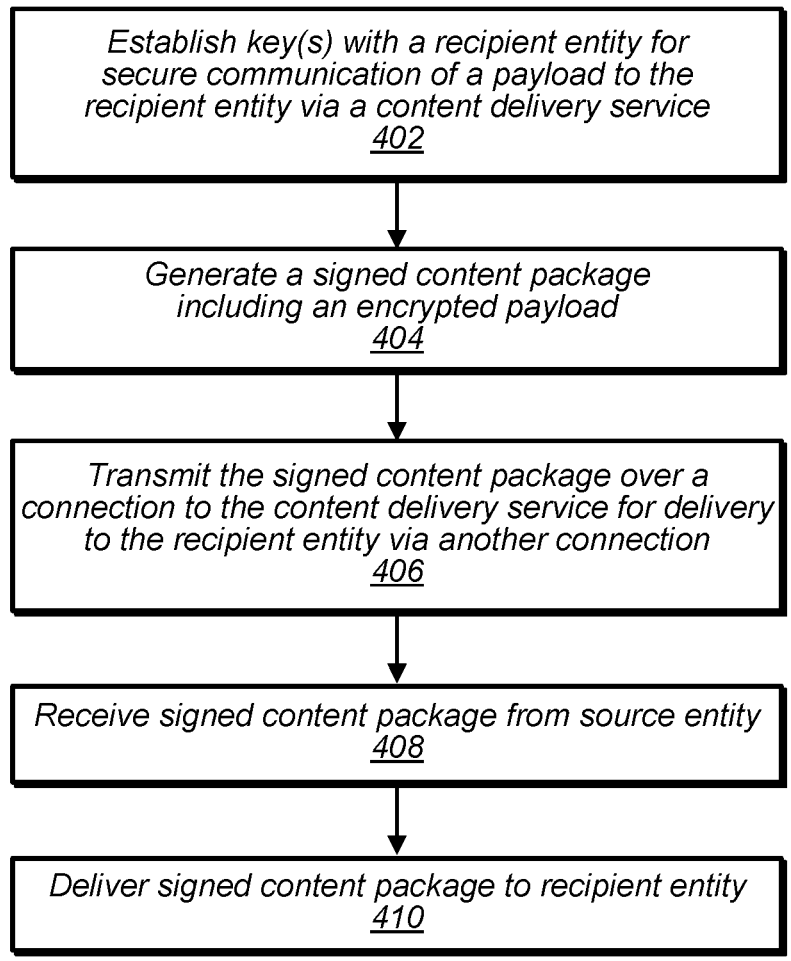
FIGS. 4A-4B illustrate a technique for transmitting content from a source to a recipient via a content delivery service, according to at least some embodiments.

Blocks 402-06 of FIG. 4A illustrate a technique for transmitting content from a source to a recipient via a content delivery service, according to at least some embodiments. Blocks 402-06 of FIG. 4A illustrates a process of content package generation and transmission that may be performed by one or more components of a source entity (e.g., source entity 120). FIG. 4A begins with what may be an initialization process. In the depicted embodiment (block 402), one or more key(s) or key pairs (e.g., symmetric, asymmetric, etc.) may be established with a recipient entity (e.g., recipient entity 130) for secure communication of a payload to the recipient entity via a content delivery service (e.g., content delivery service 102).

For example, an administrative process or administrative user may establish a key pair via the key(s) manager 328 of the source entity and key(s) manager 337 of the recipient entity 130 during an initialization process. In at least some cases, the keys are established without use of, or outside of, the communication channel managed by the content delivery service 102 (e.g., a third party to the source/recipient entities). For example, the key exchange via alternative channel 150 in FIG. 2 illustrates an alternative channel for a key exchange between the source entity and the recipient entity (e.g., a symmetric key exchange or public-private key exchange) that is not managed by the content delivery service. For example, keys may be set up, initialized, or exchanged via telephone, e-mail, other data channel, administrative process, etc. In some embodiments, the keys may be used to sign the content package 206 at the source entity and validate the signature of the same content package 206 when it is received by the recipient entity 130. The same key(s) used to sign/validate the content package or different key(s) may be used to encrypt/decrypt the payload, in embodiments.

A signed content package including an encrypted payload is generated (block 404). For instance, the content package tool 322 of the source entity 120, in concert with the encryption engine(s) 326 may encrypt a payload (e.g., content from content data store 321), and/or generate content package 206 from the encrypted payload 212, UI code 208, and payload handler 210 (e.g., stored in Payload Handler(s), UI code data store 323). A signature 214 may be generated based on the assembled content package and added to the package.

The signed content package, including the encrypted payload is transmitted over a connection to the content delivery service for delivery to the recipient entity via another connection (block 406). For instance, the communication manager 324 of the source entity 120 may transmit the content package 206 to an edge server 204 of content delivery service 102 via connection A.

Blocks 408 and 410 of FIG. 4A illustrate a process associated with a content delivery service 102, in embodiments. FIG. 4A illustrates that the content delivery service 102 receives the signed content package 206 from the source entity 120 (block 408) and delivers the signed content package 206 to a recipient entity 130. The content delivery service 102 may store the content package 206 (e.g., at one or more edge servers 204) and may deliver the signed content package 206 to any number of recipients, in embodiments.

Figure 4B:
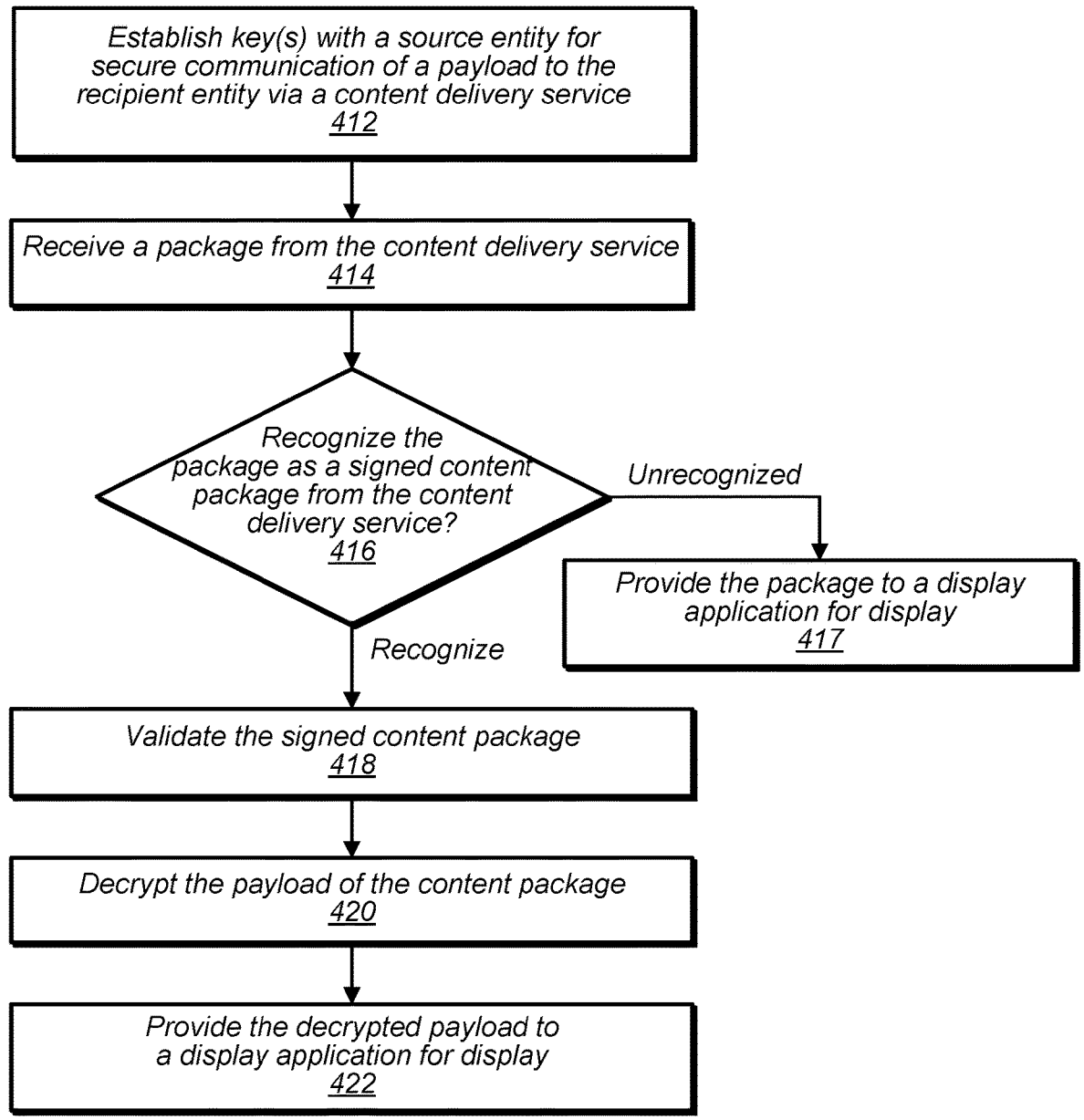

FIG. 4B illustrates a process associated with a recipient entity, in embodiments. FIG. 4B illustrates that the process may begin with an initialization process that may correspond with block 402 of FIG. 4A. In particular, key(s) or key pairs may be established (e.g., by key(s) manager 337 of recipient entity 130) with a source entity for secure communication of a payload to the recipient entity via a content delivery service (block 412). A package is received from the content delivery service (block 414). For instance, an edge server 204 (or the like) of the content delivery service 102 may transmit the content package 206 to one or more recipients (e.g., recipient entity 130) via a network connection such as network 310.

The received package may be recognized as a signed content package from the content delivery service (block 416). For instance, a secure content agent 332 or a display application 338 may be configured to recognize some identifier of the content package such as the universal resource locator (URL) when the content package 206 is a webpage, or based on some of the header information (e.g., headers for an http-based communication channel). In some embodiments, the display application 338 may include secure content agent 332 that is configured to recognize the received package as a signed content package. Recognition of the particular source URL (e.g., via URL filtering) may trigger the validation component to run. In some embodiments, the secure content agent may be configured to identify rogue content (e.g., malicious content that attempts to appear as trusted, but tries to obtain the password and exfiltrate the password to a malicious party). For instance, the recipient machine may be configured with a white list of URLs that, if matched to the content package, cause an error message or prevent entry of the user's password.

The recipient entity 130 may be configured to recognize the content package via various other mechanisms, such as by recognizing some header information, or the like. If the received package goes unrecognized it may be passed to a display application for display (block 417). Otherwise, the signature of a recognized package may be validated (e.g., validated by the validation manager 334 using a key from the initialization process at block 412), the payload of the content package decrypted by decryption engine(s) 337 (block 420) and the decrypted payload provided (e.g., provided by the secure content agent 332) to a display application for display (block 422). For example, the payload handler 210 may incorporate the decrypted content into a webpage displayed by a display application 338 (e.g., into the page displayed by a browser or the like).

Figure 5:
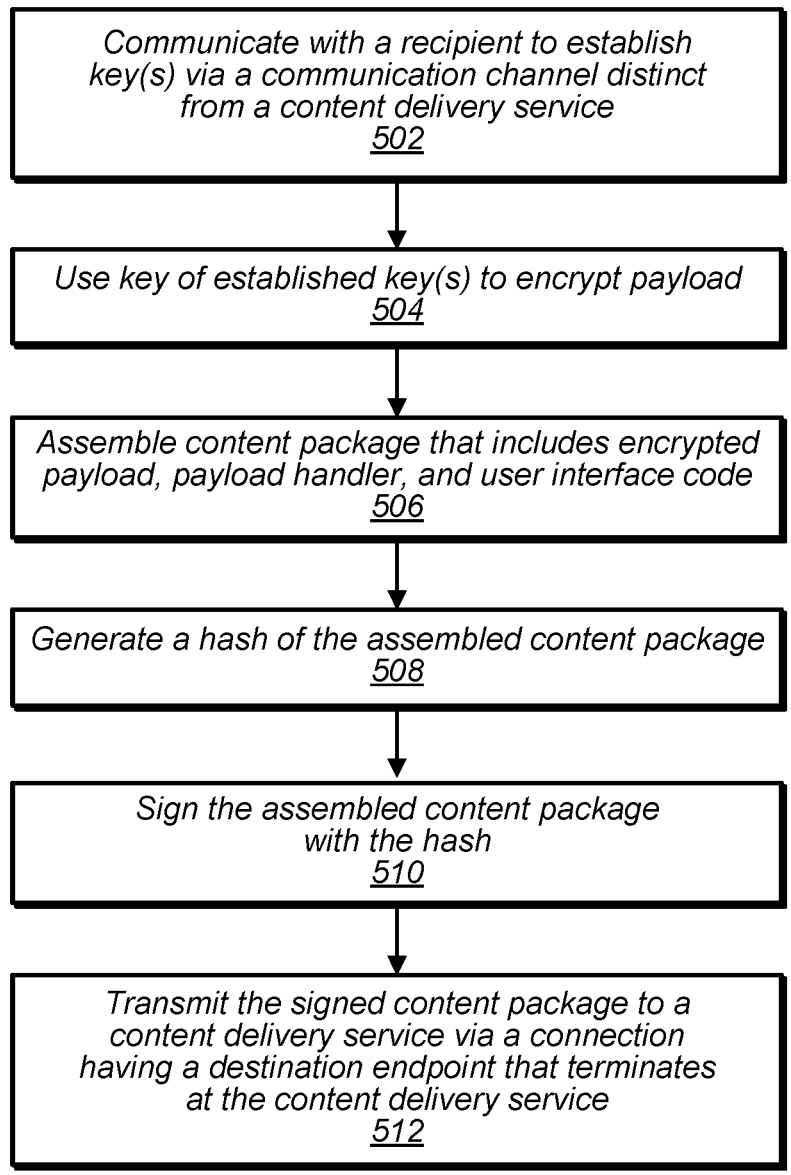
FIG. 5 illustrates a process diagram of a technique for generating and transmitting a signed content package, according to at least some embodiments.

FIG. 5 illustrates a process diagram of a technique for generating and transmitting a signed content package to a recipient via a content delivery service, according to at least some embodiments. The illustrated functionality may be performed by one or more components (e.g., software components) of the source entity 120, in embodiments. In some embodiments, blocks 502-514 illustrate an embodiment similar to the embodiment depicted in blocks 402-406 of FIG. 4A.

At block 502, the source entity 120 communicates with a recipient entity to establish a key or key pairs via a communication channel distinct from a content delivery service (e.g., alternative channel 150). In some embodiments, the keys may be established as part of an initialization process, by an admin that installs the keys via the key(s) manager 328, for example.

In embodiments, either a shared symmetric key or the public component of an asymmetric key is provided to the source entity 120, outside of the communication channel managed by the content delivery service 102. For instance, the payload may be deciphered by the recipient entity via application of a password derivation function (e.g., Bcrypt, PBKDF2, etc.) and a symmetric decryption algorithm (e.g., AES). In some embodiments, an asymmetric private key may be decrypted and then used to decrypt the encrypted payload 212 (e.g., RSA, ECC, etc.).

A key of the established key(s) may be used to encrypt a payload. For instance, encryption engine(s) 326 may use any of a number of encryption functions to encrypt content from a content data store 321. A content package that includes the encrypted payload, a payload handler, and user interface code is assembled (block 506). The content package tool 322 of the source entity may assemble the content package 206, in embodiments. A hash of the assembled content package is generated (e.g., via the content package tool 322) (block 508). The hash and/or the hash algorithm may be added to the content package 206 as a signature, in embodiments (510). The signed content package is transmitted to the content delivery service 102 via a connection (e.g., connection A in FIG. 2) having a destination endpoint that terminates at the content delivery service (e.g., via communications manager 324) (block 512).

Figure 6:
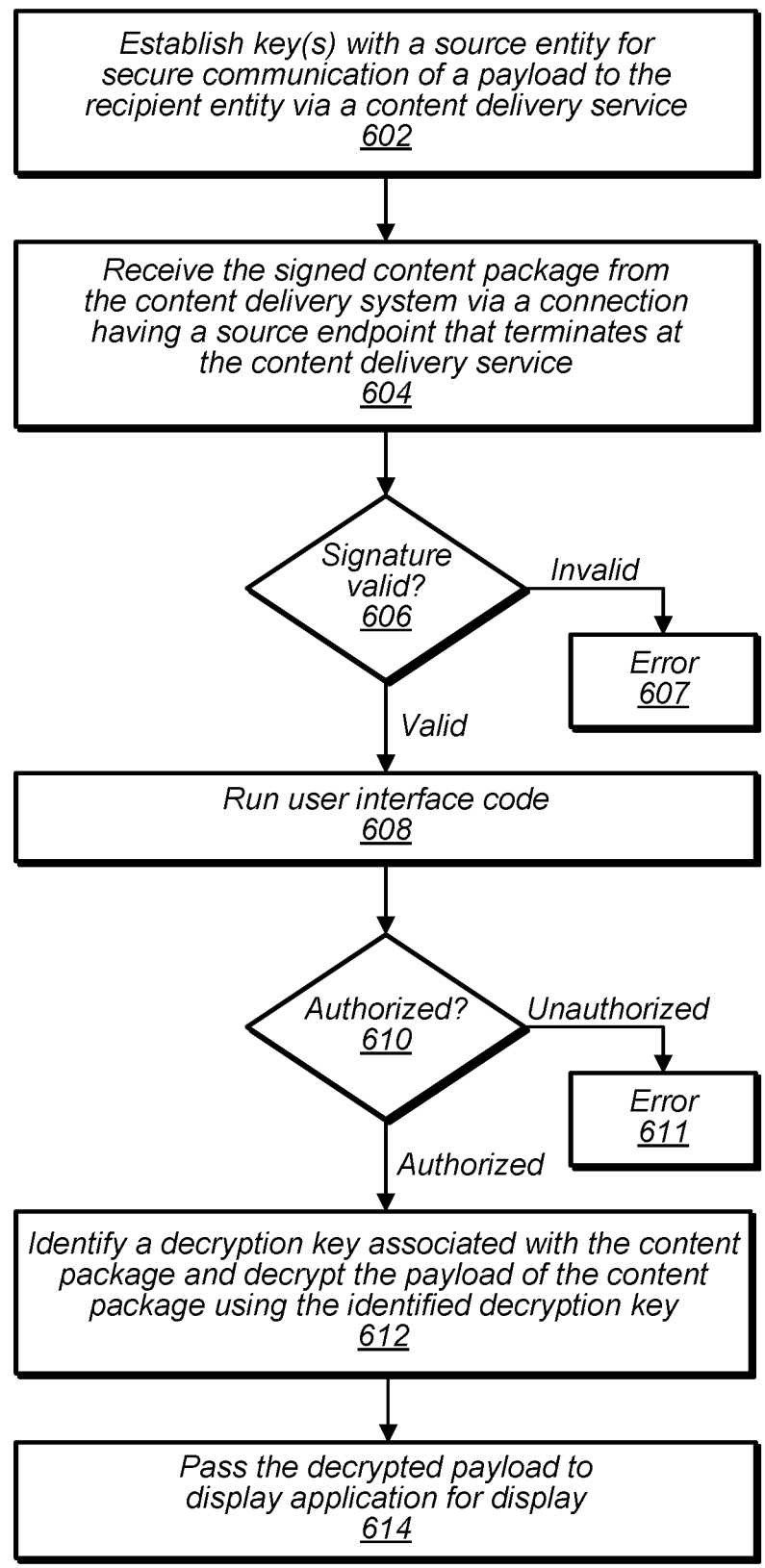
FIG. 6 illustrates a process diagram of a technique for receiving and decrypting a signed content package, according to at least some embodiments.

FIG. 6 illustrates a process diagram of a technique for receiving and decrypting a signed content package, according to at least some embodiments. The illustrated functionality is performed by a recipient entity 130, in embodiments. The illustrated process may correspond to the process illustrated in FIG. 4B, in embodiments.

At block 602, key(s) are established with a source entity for secure communication of a payload to the recipient entity via a content delivery service. The signed content package is received from the content delivery system via a connection having a source endpoint that terminates at the content delivery service (block 604). For example, FIG. 2 illustrates that content package 206 is received over connection B at recipient entity 130 from content delivery service 102. The illustrated connection B has a source endpoint that terminates at content delivery service 102. However, since the content package 206 that is transmitted over connection B is the same content package 206 that was transmitted over connection A, the contents remain encrypted during storage or processing by the content delivery network 102.

At block 606, validation manager 334 validates the content package. In some embodiments, validation may rely upon longer-lived credentials such as those provided via the x.509 system or some other certificate-based trust authority, for instance. Some systems may rely upon a public/private key scheme that does not use a certificate-based trust authority. For invalid content packages (block 606, invalid) an error message and/or error processing may be performed. For instance, a response message indicating the error may be generated and sent in response to receipt of the package or an indication of the error may be displayed (e.g., via the display application 338). Entry of the password may be prevented or hindered for invalid packages. For valid content packages, the contents of the content package 206 may be unpacked and the UI code 208 may be run on the recipient entity 130 (block 608).

When run, the UI code causes display of user interface elements that prompt for entry of a secret (e.g., password), in embodiments. The secret may be used (e.g., in concert by the UI code and the key(s) manager 337) to determine whether the recipient entity (or the user of the recipient entity) (block 610, authorized) is authorized to view the content. For an authorized recipient, the key(s) manager 337 may identify a decryption key associated with the content package and the decryption engines(s) 337 may decrypt the payload of the content package using the identified decryption key (block 612). The secret obtained by the UI code may be used to determine the key used to decrypt the encrypted content of the particular content package, in embodiments (e.g., the decryption key may be derived from the secret, in embodiments).

At block 614, the decrypted payload is passed to a display application for display, in embodiments. For example, payload handler 210 may incorporate the decrypted (e.g., plaintext) content into a webpage that is displayed by display application 338 (e.g., a browser).

UI Code

In some embodiments, UI code 208 is packaged as part of the content package 206 that is sent to and received by the recipient entity 130. Generally, the UI code 208 (e.g., HTML, a script, a plugin or the like) is run on the recipient entity (e.g., a computing device) and obtains a secret from a user that is used to identify or generate a key that is used to decrypt the encrypted payload 212. UI code 208 may include elements that are displayed in a display application (e.g., user interface elements that prompt for and accept entry of a password in a browser). The UI code may include instructions for obtaining the password and providing the password to the secure content agent.

In some embodiments, the content package may be generated and sent without the UI Code 208. For instance, the secret that is obtained by the UI code executing on the recipient (e.g., a key) may instead be stored on the recipient entity (e.g., in key(s) manager 337). For example, a key may be placed on the recipient entity during an initialization process or by an administrator, or the like. In this embodiment, instead of the UI code prompting a user for a secret, the content package is recognized and the secret is automatically obtained (e.g., by the payload handler 210 or by the secure content agent 332) from storage in the recipient entity 130. In embodiments, (e.g., if there are subsequent requests for related payload information, etc.) the UI code 208 may not be sent each time. Rather, the UI code 208 can be cached at the user side and re-run (e.g., for subsequent, related requests).

Illustrative System

Figure 7:
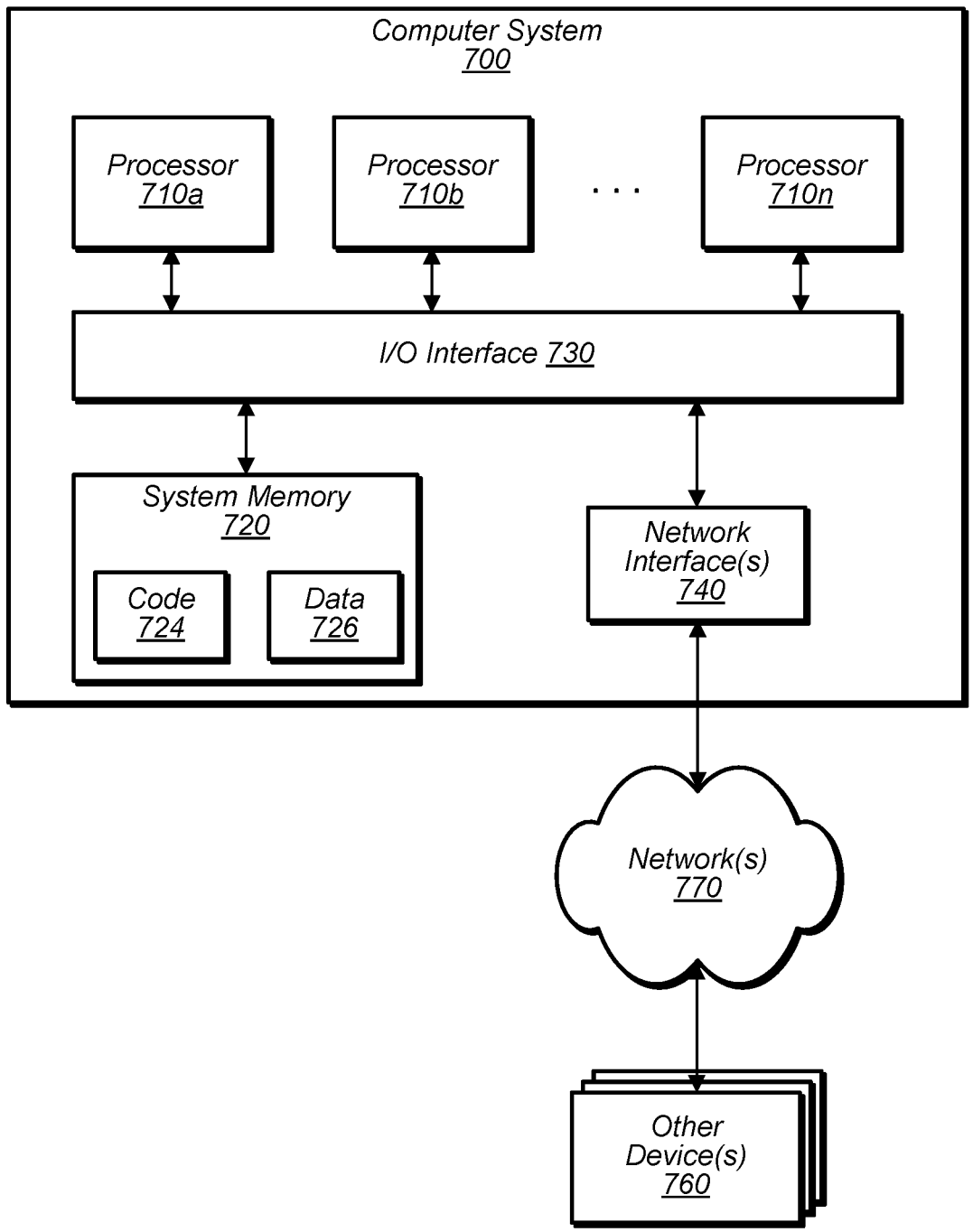
FIG. 7 is a block diagram illustrating an example computer system that may be used in some embodiments.

FIG. 7 is a block diagram illustrating an example computer system that may be used in some embodiments that implement secure transport of content via a content delivery service. In at least some embodiments, one or more servers that implement a portion or all of the content delivery service as described herein may include a computer system configured to be accessed by or receive content from one or more components of a computer system or device such as source entity 120, or recipient entity 130, for example. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for secure transport of content via a content delivery service, are shown stored within system memory 720 as code 724 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 950 (e.g., network 310 in FIG. 3), such as other computer systems or devices as illustrated in FIGS. 1-3, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above for FIGS. 1-6 for implementing embodiments of secure transport of content via a content delivery service. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
one or more hardware processors configured to implement a recipient entity configured to:
receive, from a content delivery network, a content package comprising:
an encrypted payload comprising a payload encrypted with a key, of one or more keys for secure communication of the payload from a source entity to the recipient entity via the content delivery network, wherein the one or more keys are established outside of the content delivery network; and
payload handler code configured to execute at the recipient entity to initiate processing of the encrypted payload at the recipient entity;
wherein the content package, received from the content delivery network, includes both the encrypted payload and the payload handler code configured to execute at the recipient entity to initiate processing of the encrypted payload;
process the encrypted payload from the content delivery network, wherein said process is initiated by the payload handler code executing at the recipient entity, and comprises decrypt the payload with one of the one or more keys; and
provide the processed payload to a display application for display.

2. The system of claim 1, wherein:
a first hash of the content package is included with the content package received by the recipient entity; and
the recipient entity is configured to:
validate the first hash, comprising:
hash the received content package to produce a second hash, and
compare the second has to the first hash.

3. The system of claim 2, wherein said validate the first hash comprises use a private key bound to the recipient entity in a certificate from a trust authority to hash the received content package to produce the second hash.

4. The system of claim 1, wherein:
said establishment of the one or more keys outside of the content delivery network comprises configure the recipient entity with a symmetric key or with an asymmetric private key during an initialization process without use of the content delivery network; and
said decrypt the payload comprises use either the symmetric key or the asymmetric private key to perform said decrypt the payload.

5. The system of claim 1, wherein the recipient entity is configured to, responsive to receipt of a signed content package, from the content delivery network, comprising another encrypted payload and user interface code configured to be executed by the recipient entity in order to obtain a secret:
determine whether the signature is valid;
for an invalid signature, generate an error message or perform error processing; and
for a valid signature:
run the user interface code and obtain the secret;
determine, based on the secret, whether decryption of the payload is authorized;
if authorized:
decrypt the encrypted payload of the signed content package; and
pass the decrypted payload of the signed content package to the display application for display; and
if not authorized, generate an error message, or perform error processing.

6. The system of claim 1, wherein:
the content package received from the content delivery network includes user interface code configured to be executed by the recipient entity in order to obtain a secret for determining whether decryption of the payload is authorized; and
the user interface code is cached at the recipient entity and re-run for subsequent content packages, received at the recipient entity and that do not include the user interface code, to determine whether decryption of the payloads of the subsequent content packages is authorized.

7. The system of claim 1, wherein:
the payload is web page content, and
the payload handler code is further configured to incorporate the web page content, after being decrypted, into a web page to be displayed by a browser at the recipient entity.

8. A method, comprising:
performing by one or more computers:
receiving, from a content delivery network at a recipient entity, a content package that includes:
a payload encrypted with a key, of one or more keys for secure communication of the payload from a source entity to the recipient entity via the content delivery network, wherein the one or more keys are established outside of the content delivery network, and
a payload handler configured to initiate processing of the encrypted payload;
wherein the content package, received from the content delivery network, includes both the encrypted payload and the payload handler code configured to execute at the recipient entity to initiate processing of the encrypted payload;
processing the encrypted payload from the content delivery network, wherein said processing is initiated by the payload handler code executing at the recipient entity, and comprises decrypting the payload with one of the keys; and
providing the processed payload to a display application for display.

9. The method of claim 8, wherein:
the received content package that includes the payload, and the payload handler, further includes user interface code configured to execute at the recipient entity to obtain a secret used to authorize decryption of the payload of the received content package;
the method further comprises:
obtaining, via execution of the user interface codes at the recipient entity, the secret; and
authorizing, based at least in part on the obtained secret, decryption of the payload at the recipient entity.

10. The method of claim 8, wherein:
the content package received by the recipient entity includes a first hash of the content package; and
the method further comprises: validating the first hash, comprising:
hashing the received content package to produce a second hash, and
comparing the second has to the first hash.

11. The method of claim 10, wherein said validating the first hash comprises using a private key bound to the recipient entity in a certificate from a trust authority to hash the received content package to produce the second hash.

12. The method of claim 8, wherein:
said establishing the one or more keys for secure communication of the payload comprises configuring the recipient entity with a symmetric key or with an asymmetric private key during an initialization process without use of the content delivery network; and
said decrypting the payload comprises using either the symmetric key or the asymmetric private key to perform said decrypting the payload.

13. The method of claim 8, wherein to perform said establishment of the one or more keys outside of the content delivery network, the method comprises:
establishing at least one of the one or more keys via telephone, e-mail, data channel, or administrative process.

14. The method of claim 8, wherein:
the payload is web page content, and
the method further comprises incorporating, by the payload handler code, the decrypted web page content into a web page displayed by a browser at the recipient entity.

15. One or more non-transitory computer readable storage media storing program instructions that, when executed on or across one or more processors, cause the one or more processors to:
responsive to receipt, at a recipient entity and from a content delivery network, of a content package comprising an encrypted payload comprising the payload encrypted with a key, of the one or more keys for secure communication of the payload from a source entity to the recipient entity via the content delivery network, wherein the one or more keys are established outside of the content delivery network, and payload handler code configured to execute at the recipient entity to initiate processing of the encrypted payload at the recipient entity:
process the encrypted payload included in the content package received from the content delivery network, wherein said process is initiated by the payload handler code, included in the content package received from the content delivery network, at the recipient entity and wherein said process comprises decrypt the payload with one of the keys; and
provide the processed payload to a display application for display.

16. The one or more non-transitory computer readable storage media of claim 15, wherein:
a first hash of the content package is included with the content package received by the recipient entity; and
the program instructions cause the one or more processors to validate the first hash, comprising:
hash the received content package to produce a second hash, and
compare the second hash to the first hash.

17. The one or more non-transitory computer readable storage media of claim 16, wherein to perform said validate the first hash the program instructions further cause the one or more processors to use a private key bound to the recipient entity in a certificate from a trust authority to hash the received content package to produce the second hash.

18. The one or more non-transitory computer readable storage media of claim 15, wherein:
the content package received from the content delivery network includes user interface code configured to be executed by the recipient entity in order to obtain a secret;
the programs instructions cause the one or more processors to decipher the encrypted payload via at least:
application of a key derivation function to the obtained secret to derive a key; and
use the derived key to decrypt the encrypted payload.

19. The one or more non-transitory computer readable storage media of claim 15, wherein the payload comprises a web page content, and wherein the payload handler in the content package is further configured to incorporate, when run on the recipient entity, the decrypted content into a webpage displayed by a browser of the recipient entity.

20. The one or more non-transitory computer readable storage media of claim 15, wherein the program instructions cause the one or more processors to, responsive to receipt of a signed content package, from the content delivery network, comprising another encrypted payload and user interface code configured to be executed at the recipient entity in order to obtain a secret:
determine whether the signature is valid;
for an invalid signature, generate an error message or perform error processing;
for a valid signature, run the user interface code and obtain the secret;
determine, based on the secret, whether decryption of the encrypted payload is authorized;
if authorized:
decrypt the encrypted payload of the signed content package; and
pass the decrypted payload of the signed content package to the display application for display; and
if not authorized, generate an error message or perform error processing.

* * * * *